July 9, 1968      E. W. LINES      3,392,032

BOTTLES

Filed Oct. 23, 1965

INVENTOR
EDGAR W. LINES

BY Cushman, Darby & Cushman
ATTORNEYS 3,392,032
BOTTLES
Edgar W. Lines, Morristown, N.J., assignor to Weston Chemical Corporation, Newark, N.J., a corporation of New Jersey
Filed Oct. 23, 1965, Ser. No. 502,930
The portion of the term of the patent subsequent to Sept. 12, 1984, has been disclaimed
10 Claims. (Cl. 99—171)

ABSTRACT OF THE DISCLOSURE

Clear containers are made of rigid polyvinyl chloride containing as a stabilizer therefor the condensation product of 2 moles of 4,4'-isopropylene dicyclohexanol with 3 moles of a phosphite having the formula

Figure 1:
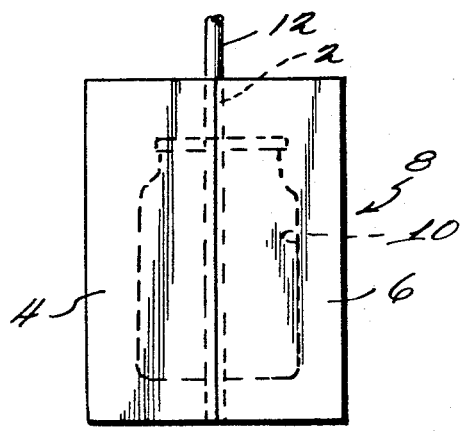

where $R_1$, $R_2$ and $R_3$ are selected from the group consisting of alkyl, aryl and haloaryl, said condensation being carried to the extent that 65 to 78% of the theoretical amount of monohydric compounds having the formulae $R_1OH$, $R_2OH$ and $R_3OH$ are formed. The containers are suitable for food uses.

---

The present invention relates to novel rigid polyvinyl chloride resin containers.

Rigid polyvinyl chloride resins today are normally stabilized with tin containing stabilizers in order to get both stability and good clarity. Tin containing stabilizers, however, exhibit toxic properties and have not been approved for food uses.

It has also been proposed to use phosphite stabilizers in rigid vinyl chloride resins. The best of such phosphites is diphenyl isooctyl phosphite. However, when this phosphite is employed it is essential to add calcium and zinc salts, e.g., calcium stearate and zinc stearate as well as a blue or green toner to mask the color. Additionally, there cannot be obtained containers having good clarity.

Accordingly, it is an object of the present invention to prepare stabilized rigid vinyl chloride resin bottles having optimum clarity.

Another object is to prepare such bottles which are suitable for food uses.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by forming rigid vinyl chloride resin bottles utilizing as a stabilizer certain polymeric phosphites made from hydrogenated bisphenol A (4,4'-isopropylidene dicyclohexanol) and a tertiary hydrocarbyl phosphite or haloaryl phosphite.

The polymeric phosphites are solids and are normally prepared by reacting two moles of a triaryl phosphite, e.g., triphenyl phosphite (TPP), or the like with three moles of hydrogenated bisphenol A (HBPA).

Varying amounts of phenol are removed from this system to provide increased phosphorus content, increased molecular weights and decreased amounts of free hydroxyl groups. Thus by reacting the 2 moles of TPP with 3 moles of HBPA and stripping out 4 moles of phenol there is formed a first polymer unit which has the following formula

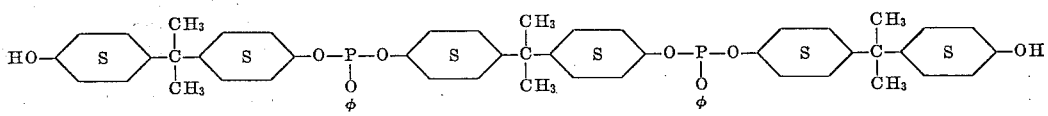

This unit will be referred to hereinafter as a Triad and the letter $n$ used to designate the number of such Triad units in the polymer molecule.

Thus when $n$ is one as in the indicated formula the molecular weight is 964, the phosphorus content is 6.4% and the hydroxyl number is 116.

In the event that 4.5 moles of phenol are stripped out (9 moles from 2 triads) the formula of the product is

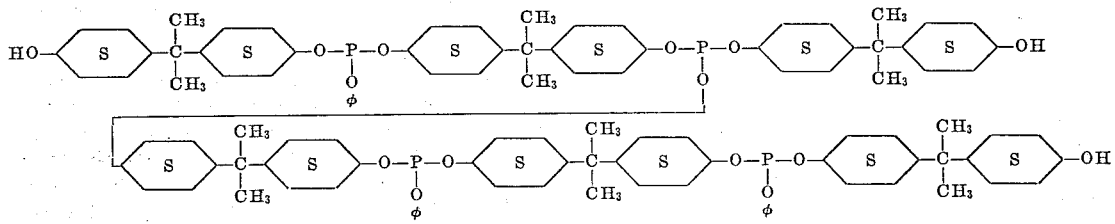

having a molecular weight of 1834, phosphorus content of 6.7% and a hydroxyl number of 91.

If 4.67 moles of phenol are stripped out (14 moles from 3 triads) the formula of the product is

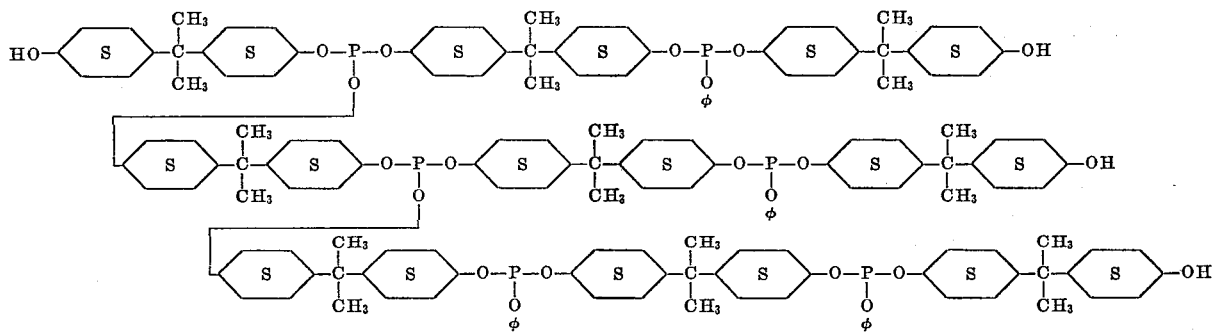

having a molecular weight of 2704, phosphorus content of 6.8% and hydroxyl number of 82.

The following table summarizes the products obtained by reacting TPP with HBPA in the ratio of 2 moles to 3 moles.

TABLE 1

| Triads, n | Phenols out (mols) | | Molecular wt. of polymer | P atoms/ molecule | P, percent | Hydroxyl | |
|---|---|---|---|---|---|---|---|
| | Total | Per n | | | | Groups/ Molecule | No. |
| 1 | 4 | 4 | 964 | 2 | 6.4 | 2 | 116 |
| 2 | 9 | 4.5 | 1,834 | 4 | 6.7 | 3 | 91 |
| 3 | 14 | 4.67 | 2,704 | 6 | 6.8 | 4 | 82 |
| 4 | 19 | 4.75 | 3,574 | 8 | 6.9 | 5 | 79 |
| 5 | 24 | 4.80 | 4,444 | 10 | 7.0 | 6 | 76 |
| 6 | 29 | 4.83 | 5,314 | 12 | 7.0 | 7 | 74 |
| 7 | 34 | 4.85 | 6,184 | 14 | 7.03 | 8 | 72.8 |
| 8 | 39 | 4.86 | 7,054 | 16 | 7.03 | 9 | 71.6 |
| 9 | 44 | 4.88 | 7,924 | 18 | 7.04 | 10 | 70.8 |
| 10 | 49 | 4.89 | 8,794 | 20 | 7.05 | 11 | 70.2 |
| 11 | 54 | 4.91 | 9,664 | 22 | 7.05 | 12 | 69.7 |
| 12 | 59 | 4.91 | 10,534 | 24 | 7.05 | 13 | 69.2 |
| 17 | 84 | 4.94 | 14,884 | 34 | 7.1 | 18 | 67.8 |

The preferred phosphite stabilizers have 1 to 4 triads, most preferably 3 triads.

Figure 2:
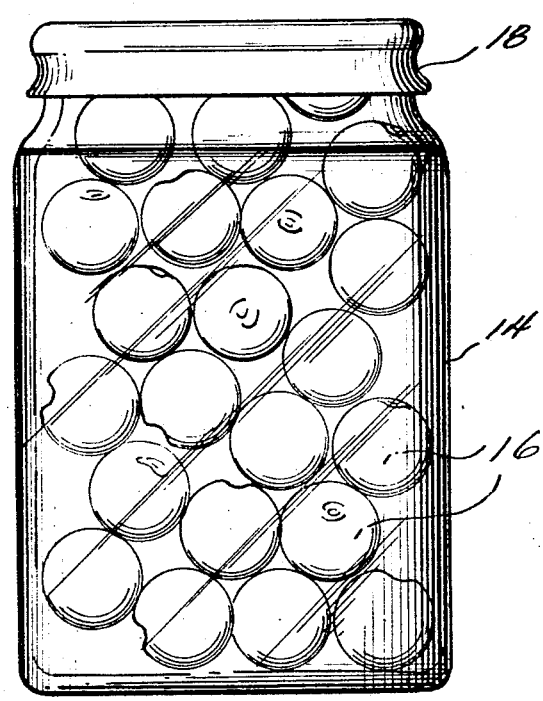

The invention will be best understood in connection with the drawings wherein:

FIGURE 1 is a view showing the blow molding of a bottle according to the invention; and FIGURE 2 is a plan view of a bottle prepared according to the invention.

Referring more specifically to the drawing a parison 2 is extruded of rigid polyvinyl chloride containing as a stabilizer 0.5 part of the triphenyl phosphite hydrogenated bisphenol A condensation product having a molecular weight of 2704 (the polymer containing 3 triads) and a phosphorus content of 6.8%, and 2 parts of a calcium and Zn stearate stabilizer. The parison is then positioned between the sections 4 and 6 of blow mold 8. The mold sections 4 and 6 are then engaged as shown in FIGURE 1 to form the mold 8 having a cavity 10 of a shape corresponding to the bottle to be formed.

After closing the mold 8, high velocity air is introduced through nozzle 12 at about 40 p.s.i. into the parison 2 to expand it to fill the die cavity 10. The parison still hot from the extrusion had a temperature of about 350° F. at the commencement of the blowing operation. In the blowing of the parison to form the bottle there was a lateral stretching of about 50%.

The finished blow molded bottle 14 is shown in FIGURE 2. The bottle was water white and perfectly clear. The bottle was filled with cherries 16 and closed with cap 18. The cap can be of any conventional type, e.g., metal or plastic such as polyvinyl chloride, melamine-formaldehyde, polyethylene, polypropylene.

The blow molded bottles are characterized by being stretch oriented at least 25% in at least one direction. The parison can be stretched longitudinally during its formation. In such case, the finished bottle is biaxially oriented. The stretch orientation is usually between 25 and 200%, although it can be even greater.

It is also possible to injection mold bottles of vinyl chloride resins stabilized according to the invention although preferably blow molded bottles are employed.

The blow molded bottles of the present invention can be used to package beer, wine, liquor, milk, baby food, peanuts, popcorn, flour, cake mix, soup, instant coffee, regular ground coffee, dehydrated vegetables and fruits, olives, cherries, beets, sliced peaches, detergents (both liquid and powder types), perfume.

The stabilized polyvinyl chloride bottles of the present invention are the first clear, polyvinyl chloride bottles which are safe as containers for foods.

The technology included can be applied to rigid vinyl film and sheeting also.

The rigid vinyl chloride resins are preferably of the kind known as Type I, i.e., polyvinyl chloride and copolymers of vinyl chloride with a minor amount, e.g., up to 15% of a copolymerizable monomer such as vinyl acetate, vinylidene chloride, alkyl maleates and fumarates, e.g., dibutyl fumarate and diethyl maleate, vinyl buyrate, butyl acrylate, methyl acrylate and other alkyl acrylates, methyl methacrylates and other alkyl methacrylates, styrene, vinyl ethyl ether and other vinyl ethers, acrylonitrile. Typical copolymers include vinyl chloride-vinyl acetate (97:3 and also 85:15), vinyl chloride-vinyl acetate-maleic anhydride (86:13:1), vinyl chloride-vinylidene chloride (95:5), vinyl chloride-acrylonitrile (90:10).

There can also be employed Type II rigid vinyl chloride resins which are mixtures of polyvinyl chloride with 5 to 20% of Type N rubbers, e.g., a mixture of 90% polyvinyl chloride with 10% rubbery butadiene-acrylonitrile copolymer.

As previously indicated, the stabilizers are formed by condensing 2 moles of hydrogenated bisphenol A with 3 moles of a tertiary phosphite. The reaction is stopped when 65–78% of the theoretical amount of phenol (or alcohol) derived from the tertiary phosphite is removed by distillation. The preferred tertiary phosphite is triphenyl phosphite. When employing triphenyl phosphite the reaction is preferably stopped while the product has 6.3–6.9% phosphorus, most preferably about 6.8%.

Unless otherwise indicated, all parts and percentages are by weight.

In place of triphenyl phosphite there can be used other alkyl, aryl and haloaryl phosphites such as tris(2-methylphenyl)phosphite, tris(3-methylphenyl)phosphite, tris(4-methylphenyl)phosphite, tris(2 - ethylphenyl)phosphite, tris(2-isopropyl)phosphite, tris(p-nonylphenyl)phosphite, tris(p-dodecylphenyl)phosphite, tris(2,4-dimethylphenyl)phosphite, tris(2-chlorophenyl)phosphite, tris(2 - bromophenyl)phosphite, tris(4 - t - butylphenyl)phosphite, tris decyl phosphite, tris(2,4,5 - trichlorophenyl)phosphite, isodecyl phosphite, tris octyl phosphite, tris(alpha naphthyl)phosphite, diphenyl 4-methylphenyl phosphite, diphenyl isodecyl phosphite, diisodecyl phenyl phosphite.

Mixtures of two or more tertiary phosphites can be used to prepare stabilizers having two or more side groups. Thus by using a mixture of 9 moles of hydrogenated bisphenol A, 3 moles of triphenyl phosphite and 3 moles of tris octyl phosphite and removing phenol and octyl alcohol until three triads are formed there is obtained a polymer having about 2 phenyl groups and 2 octyl groups. As the molecular weight of the alkyl group increases the proportion of phenyl groups to alkyl groups present in a mixed polymer goes down due to the fact that the phenyl group becomes the one most readily removed from the phosphite.

The reaction is preferably catalyzed with 0.1–5% by weight of the trihydrocarbyl phosphite of a dialkyl phosphite, a diaryl phosphite, a dihaloaryl phosphite or of an alkaline catalyst such as an alkali metal alcoholate or phenolate. As examples of catalysts there can be used diphenyl phosphite, didecyl phosphite, phenyl decyl phosphite, di(2-methylphenyl)phosphite, di(4-dodecylphenyl)phosphite, di(2-chlorophenyl)phosphite, di(2,4-dimethylphenyl)phosphite, di(4-bromophenyl)phosphite, diethyl phosphite, dicyclohexyl phosphite, dioctadecyl phosphite, sodium phenolate, sodium decylate, potassium cresylate, sodium ethylate and sodium octadecanolate. Diphenyl phosphite and similar diaryl phosphites are the preferred catalysts.

EXAMPLE 1

2160 parts of hydrogenated bisphenol A, 1860 parts of triphenyl phosphite and 24 parts of diphenyl phosphite were mixed and subjected to vacuum distillation. Terminal conditions were 205° C. and 29.5 inches of vacuum. 1140 parts of distillate were removed. The still residue was a clear solid resin with a phosphorus content of 6.4%. This product is one of the preferred ones according to the invention.

EXAMPLE 2

The procedure of Example 1 was repeated but the distillation was continued until 1271 parts of distillate were collected. The still residue was a clear solid resin with a phosphorus content of 6.7%. This product is one of the preferred stabilizers of the present invention.

EXAMPLE 3

The procedure of Example 1 was repeated but the distillation was continued until 1316 parts of distillate were collected. The still residue was a clear solid resin with a phosphorus content of 6.8%. This product also is one of the preferred stabilizers according to the invention.

The examples above are illustrative of preparing preferred stabilizers. The reaction, of course, should be stopped before a cross linked polymer is obtained. Thus if the reaction is carried to conclusion the product obtained is cross linked and has a phosphorus content of 7.98% and 6 moles of phenol are removed for each 2 moles of hydrogenated bisphenol A reacted with 3 moles of triphenyl phosphite. The product also has an extremely low hydroxyl number. In contrast the stabilizers of the present invention have relatively high hydroxyl numbers. Thus when triphenyl phosphite is the starting phosphite the product preferably has a hydroxyl number above 75. This has been found to be quite important. The alcoholic hydroxyl groups at the ends of the triads act as stabilizing points.

The solid stabilizers of the present invention are normally milled into the rigid polyvinyl chloride at 150–155° C., although the temperature can be as high as 175–185° C., using a conventional high speed mill, e.g., 270–300 ft./minute peripheral speed.

It is critical to use hydrogenated bisphenol A. If this component is replaced in part by polypropylene glycol, for example, the stability of the rigid polyvinyl chloride goes down.

As previously indicated, the stabilizers of the present invention can be used alone or with metal salts with the rigid vinyl chloride resin. There are normally used 0.5–5% of the stabilizer based on the rigid vinyl chloride resin although improvement in stability is noted with as little as 0.1% or as much as 10% of the polymeric phosphite stabilizer based on the resin.

It is frequently desirable to include in the composition conventional additives, e.g., 0.5–2% of a mold lubricant such as stearic acid, paraffin wax, mineral oil, butyl stearate, or poly dimethyl siloxane (or other silicone lubricants).

For best results it is also sometimes desirable to include 0.1–5% based on the rigid vinyl chloride resin of polyvalent higher fatty acid salts such as calcium stearate, zinc stearate calcium 2-ethylhexoate, calcium octoate, calcium oleate, calcium ricinoleate, calcium myristate, calcium palmitate, calcium laurate, barium laurate, barium stearate, magnesium stearate, cadmium laurate, cadmium octoate, cadmium stearate, sodium stearate, lead stearate, aluminum stearate, etc. Of course for food and pharmacological uses the salt should be nontoxic. Salts such as barium nonylphenolate, cadmium octylphenolate and other conventional phenol salt stabilizers can also be included.

It is also frequently desirable to include 0.1–5% based on the rigid vinyl chloride resin of an epoxy compound. Examples of such epoxy compounds include epoxidized soya bean oil, epoxidized lard oil, epoxidized olive oil, epoxidized linseed oil, epoxidized castor oil, epoxidized peanut oil, epoxidized corn oil, epoxidized tung oil, epoxidized cottonseed oil, epichlorhydrin-bisphenol A resins (epichlorhydrin-diphenylolpropane resins), phenoxy-propylene oxide, butoxy-propylene oxide, epoxidized neopentylene oleate, glycidyl epoxystearate, epoxidized alpha-olefins, dicyclopentadiene dioxide, epoxidized butyl tallate, styrene oxide, dipentene dioxide, glycidol, vinyl cyclohexene dioxide, glycidyl ether of resorcinol, glycidyl ether of hydroquinone, glycidyl ether of 1,5-dihydroxynaphthalene, epoxidized linseed oil fatty acids, allyl glycidyl ether, butyl glycidyl ether, 4-(2,3-epoxypropoxy) acetophenone, mesityl oxide epoxide, 2-ethyl-3-propyl glycidamide, glycidyl ethers of glycerine, pentaerythritol and sorbitol and 3,4-epoxycyclohexane-1, 1-dimethanol bis-9,10-epoxystearate.

EXAMPLE 4

| | Parts |
|---|---|
| Type I rigid polyvinyl chloride (Vinylite QYSJ) | 100 |
| Calcium-zinc stearate (1:1 mixture) | 2 |
| Epoxidized soyabean oil (EPO) | 3 |
| Stearic acid (processing aid) | 0.5 |
| Polymeric phosphite of Example 3 (phosphorus 6.8%) | 0.5 |

This mixture was extruded in the form of a parison and a bottle blow molded therefrom in the manner described previously. The bottle was water white and perfectly clear. Samples 125 mil thick of the formulation used in Example 4 were milled at 150–155° C. Yellowing was observed at 13 minutes. The samples were not black at 17 minutes but finally became black at 22 minutes. In contrast, when the polymeric phosphite of Example 3 was replaced in Example 4 by the same amount of commercially obtained diphenyl isooctyl phosphite the rigid polyvinyl chloride began yellowing in 3 minutes and was black in 12 minutes. Moreover, even the initial clarity with the diphenyl isooctyl phosphite was inferior to that with the polymeric phosphite.

EXAMPLE 5

A clear, water white, rigid polyvinyl chloride bottle was blow molded from a mixture of 100 parts of Vinylite QYSJ and 2 parts of the polymeric phosphite of Example 3.

EXAMPLE 6

The procedure of Example 4 was repeated replacing the polymeric phosphite of Example 3 with the polymeric phosphite of Example 2 to obtain a blow molded bottle which was water white and clear.

The bottles prepared in Examples 4–6 contained no toxic ingredients and were suitable for food uses. Also, no green or blue toners were needed to mask undesired color.

While reference has been made to clear, colorless containers it will be realized that this does not exclude the subsequent application of lettering or decoration to either the inside or outside of the container.

It is critical that the polymerization be carried to the proper extent. If the reaction is stopped too soon, e.g., when 50% of the theoretical phenol has been removed, the polymer has objectionable color. This color is reduced progressively as the phosphorus content of the polymer goes from 6.3 to 6.8% using triphenyl phosphite as the starting material.

I claim:
1. A clear container made of rigid polyvinyl chloride containing as a stabilizer therefore the condensation product of 2 moles of 4,4'-isopropylidene dicyclohexanol with 3 moles of a phosphite having the formula

where $R_1$, $R_2$ and $R_3$ are selected from the group consisting of alkyl, aryl and haloaryl, said condensation being carried to the extent that 65 to 78% of the theoretical amount of monohydric compounds having the formulae $R_1OH$, $R_2OH$ and $R_3OH$ are formed.

2. A food package comprising food packaged in the container of claim 1, said container being in the form of a clear, blow molded bottle.

3. A food packaged according to claim 2, said container being substantially water white, said food being liquid.

4. A food packaged according to claim 2, said container being substantially water white, said food being solid.

5. A container according to claim 1 wherein $R_1$, $R_2$ and $R_3$ are phenyl, said condensation being carried to the extent that the condensation product contains 6.3 to 6.9% phosphorus, said container being a blow molded bottle characterized by being stretch oriented at least 25% in one direction.

6. A food package comprising food packaged in the container of claim 5, the phosphorus content of the condensation product being 6.7 to 6.8%.

7. A food package comprising food packaged in a container according to claim 1, said container being a clear, colorless, blow molded bottle characterized by being stretch oriented at least 25% in one direction, said condensation product consisting essentially of six to nine 4,4'-isopropylidene dicyclohexanol units, 4 to 6 phosphorus atoms and 3 to 4 pendant phenyl groups, said units and atoms being arranged in from 2 to 3 triads, said polymer having a molecular weight of about 1834 to 2704.

8. A food packaged according to claim 7 wherein said condensation product has 3 triads.

9. A food package comprising food packaged in the container of claim 1 wherein said condensation product consists essentially of six to nine 4,4'-isopropylidene dicyclohexanol units, 4 to 6 phosphorus atoms and 3 to 4 pendant phenyl groups, said units and atoms being arranged in from 2 to 3 triads, said polymer having a molecular weight of about 1834 to 2704.

10. A food package according to claim 9 wherein said container is in the form of a clear, blow molded bottle.

References Cited
UNITED STATES PATENTS

| | | | |
|---|---|---|---|
| 2,951,052 | 8/1960 | Darby | 260—45.95 |
| 3,180,847 | 4/1965 | Fowler et al. | 260—45.95 |
| 3,288,317 | 11/1966 | Wiley | 215—1.5 |

OTHER REFERENCES

"Packaging Materials," Food Manufacture, pp. 370–374 (September 1960).

A. LOUIS MONACELL, *Primary Examiner.*

RAYMOND N. JONES, *Examiner.*

E. A. MILLER, *Assistant Examiner.*

UNITED STATES PATENT OFFICE
CERTIFICATE OF CORRECTION

Patent No. 3,392,032  July 9, 1968

Edgar W. Lines

It is certified that error appears in the above identified patent and that said Letters Patent are hereby corrected as shown below:

Column 4, line 70, column 5, line 72, and column 7, line 38, "3", each occurrence, should read -- 2 --. Column 4, line 70, column 5, line 71, and column 7, line 37, "2", each occurrence, should read -- 3 --.

Signed and sealed this 24th day of February 1970.

(SEAL)
Attest:

Edward M. Fletcher, Jr.  WILLIAM E. SCHUYLER, JR.
Attesting Officer  Commissioner of Patents